United States Patent
Chen et al.

(10) Patent No.: US 10,256,642 B2
(45) Date of Patent: Apr. 9, 2019

(54) POWER DELIVERY CONTROLLER

(71) Applicant: Etron Technology, Inc., Hsinchu (TW)

(72) Inventors: Shao-Hung Chen, New Taipei (TW);
Yu-Chih Hsieh, Hsinchu (TW);
Sian-Jia Chen, Taoyuan (TW);
Shih-Min Hsu, Taipei (TW)

(73) Assignee: eEver Technology, Inc., Taipei (TW)

( * ) Notice: Subject to any disclaimer, the term of this patent is extended or adjusted under 35 U.S.C. 154(b) by 281 days.

(21) Appl. No.: 14/704,993

(22) Filed: May 6, 2015

(65) Prior Publication Data
US 2015/0326039 A1 Nov. 12, 2015

Related U.S. Application Data

(60) Provisional application No. 61/989,522, filed on May 6, 2014.

(51) Int. Cl.
*H02J 7/00* (2006.01)

(52) U.S. Cl.
CPC ............ *H02J 7/0004* (2013.01); *H02J 7/007* (2013.01); *H02J 7/0052* (2013.01); *H02J 2007/0062* (2013.01)

(58) Field of Classification Search
CPC .. H02J 7/045; H02J 7/04; H02J 7/0086; H02J 7/008
See application file for complete search history.

(56) References Cited

U.S. PATENT DOCUMENTS

| 9,293,934 B2 * | 3/2016 | Xu | H02J 7/0052 |
| 2009/0184586 A1 * | 7/2009 | Bagenholm | H02J 7/00 307/125 |
| 2015/0301552 A1 * | 10/2015 | Lim | H02J 7/0052 327/538 |

FOREIGN PATENT DOCUMENTS

| CN | 101911431 A | 12/2010 |
| CN | 103367823 A | 10/2013 |

* cited by examiner

*Primary Examiner* — Drew A Dunn
*Assistant Examiner* — Sailesh Thapa
(74) *Attorney, Agent, or Firm* — Winston Hsu

(57) ABSTRACT

A power delivery controller includes a detection unit, a regulation unit, and a control unit. The detection unit has a detection pin and an enable pin, wherein the detection pin is used for detecting a power delivery consumer device. The regulation unit is coupled to the detection unit, wherein when the detection pin detects the power delivery consumer device, the detection unit is used for turning on the regulation unit through the enable pin, and after the regulation unit is turned on, the regulation unit generates an internal voltage. The control unit is coupled to the regulation unit for providing power to the power delivery consumer device according to the internal voltage. When the detection pin fails to detect the power delivery consumer device, the regulation unit is turned off.

10 Claims, 10 Drawing Sheets

POWER DELIVERY CONTROLLER

CROSS REFERENCE TO RELATED APPLICATIONS

This application claims the benefit of U.S. Provisional Application No. 61/989,522, filed on May 6, 2014 and entitled "USB power delivery controller with power saving mode," the contents of which are incorporated herein by reference.

BACKGROUND OF THE INVENTION

1. Field of the Invention

The present invention relates to a power delivery controller, and particularly to a power delivery controller that can turn on or off a control unit and a regulation unit thereof according to whether a power delivery consumer device is coupled to the power delivery controller.

2. Description of the Prior Art

Nowadays, portable electronic devices have become widely popular to significantly increase convenience and entertainment of users in daily life. Because a user having a portable electronic device may simultaneously execute a plurality of application programs in the portable electronic device, power of a battery installed within the portable electronic device will be quickly exhausted, resulting in the portable electronic device being turned off. Therefore, the prior art provides a power delivery technology, wherein the power delivery technology makes the power delivery provider charge the battery installed within the portable electronic device according to specifications of the power delivery technology. However, before the portable electronic device is coupled to the power delivery provider or the portable electronic device transmits specifications of the portable electronic device to the power delivery provider, internal function units of the power delivery controller are always turned on, resulting in the power delivery controller wasting power. Therefore, the power delivery controller provided by the prior art is not a good choice for the user.

SUMMARY OF THE INVENTION

An embodiment of the present invention provides a power delivery controller. The power delivery controller includes a detection unit, a regulation unit, and a control unit. The detection unit has a detection pin and an enable pin, wherein the detection pin is used for detecting a power delivery consumer device. The regulation unit is coupled to the detection unit and an external power, wherein when the detection pin detects the power delivery consumer device, the detection unit is used for turning on the regulation unit through the enable pin, and after the regulation unit is turned on, the regulation unit generates a direction current (DC) internal voltage based on the external power. The control unit is coupled to the regulation unit for providing power to the power delivery consumer device according to the internal voltage. When the detection pin fails to detect the power delivery consumer device, the regulation unit is turned off.

Another embodiment of the present invention provides a power delivery controller. The power delivery controller includes a control unit. The control unit is used for providing power to a power delivery consumer device, and the control unit includes a power source unit, an interface protocol unit, and a policy engine. The interface protocol unit is used for communicating power delivery specifications of the power delivery consumer device with the power delivery consumer device. The policy engine is used for controlling the power source unit to provide the power to the power delivery consumer device according to the power delivery specifications of the power delivery consumer device. When the interface protocol unit communicates the power delivery specifications of the power delivery consumer device with the power delivery consumer device, the power source unit is turned off; and after the interface protocol unit identifies the power delivery specifications of the power delivery consumer device, the policy engine turns on the power source unit, and controls the power source unit to provide the power to the power delivery consumer device according to the power delivery specifications of the power delivery consumer device.

Another embodiment of the present invention provides a power delivery controller. The power delivery controller includes a control unit. The control unit is used for providing power to a power delivery consumer device, and the control unit includes a power source unit, an interface protocol unit, and a policy engine. The interface protocol unit is used for communicating power delivery specifications of the power delivery consumer device with the power delivery consumer device. The policy engine is used for controlling the power source unit to provide the power to the power delivery consumer device according to the power delivery specifications of the power delivery consumer device. When the power source unit charges a battery coupled to the power delivery consumer device through the power delivery consumer device, the power delivery consumer device transmits a storage power percentage, a charge full state, or a stop charge state of the battery to the control unit, wherein when the control unit receives the charge full state or the stop charge state, the power source unit stops providing the power to the battery, and the power source unit is turned off, or when the control unit receives the storage power percentage and the storage power percentage is greater than a predetermined value, the power source unit stops providing the power to the battery, and the power source unit is turned off.

The present invention provides a power delivery controller. A regulation unit (or the regulation unit and a control unit) of the power delivery controller is (or are) turned on or off according to whether a power delivery consumer device is coupled to the power delivery controller. In addition, the regulation unit (or the regulation unit and the control unit) of the power delivery controller is (or are) also turned on or off according to a battery charging state of an external battery coupled to the power delivery consumer device. Therefore, the present invention can save more power than the prior art.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
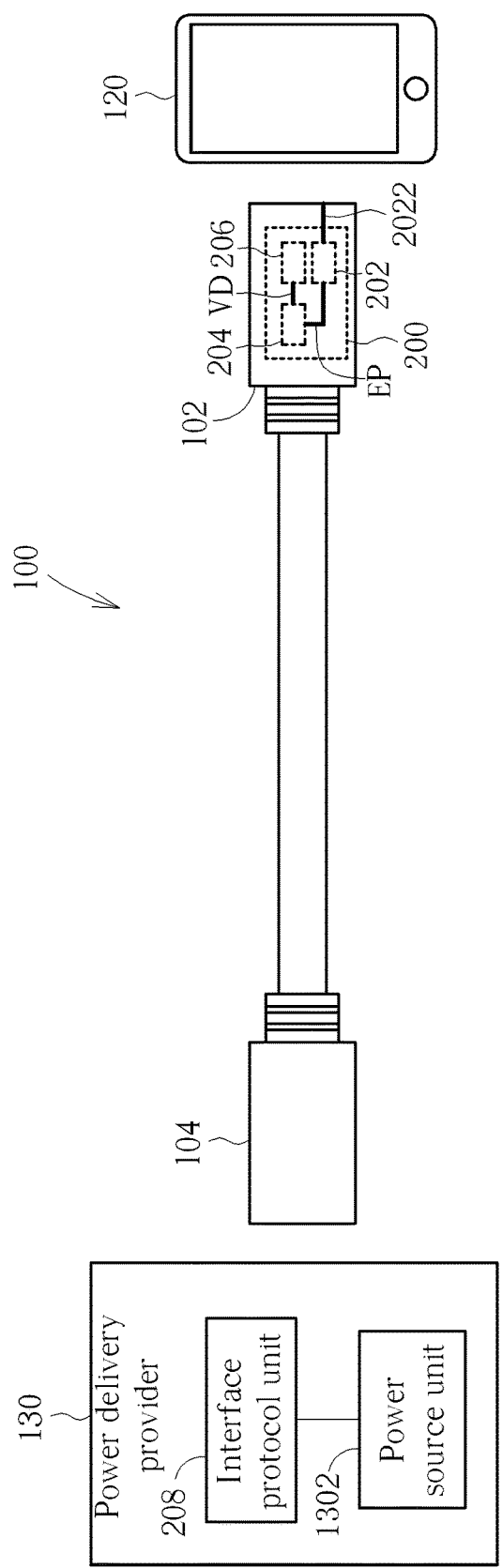
FIG. 1 is a diagram illustrating a power delivery controller according to a first embodiment of the present invention.

Please refer to FIG. 1. FIG. 1 is a diagram illustrating a power delivery controller 200 according to a first embodiment of the present invention, wherein the power delivery controller 200 is applied to a universal serial bus (USB) cable 100. As shown in FIG. 1, the power delivery controller 200 includes a detection unit 202, a regulation unit 204, and a control unit 206, wherein the regulation unit 204 is coupled to the detection unit 202 and an external power source, and the control unit 206 is coupled to the regulation unit 204, and the detection unit 202 has a detection pin 2022. The regulation unit 204 can be a low dropout regulator or a voltage regulator. In addition, the USB cable 100 includes a first connector 102 and a second connector 104, and the power delivery controller 200 can be installed within the first connector 102. But, the present invention is not limited to the power delivery controller 200 being installed within the first connector 102. That is to say, the power delivery controller 200 can be also installed within the second connector 104, or installed within the power delivery provider 130, wherein the power delivery provider 130 can act as the external power source coupled to the regulation unit 204. In addition, the first connector 102 can be a type A connector, a type B connector, a mini-A connector, a mini-B connector, a micro-A connector, or a micro-B connector of USB, and a second connector 104 can also be a type A connector, a type B connector, a mini-A connector, a mini-B connector, a micro-A connector, or a micro-B connector of USB. But, the present invention is not limited to the power delivery controller 200 being applied to the USB cable 100, That is to say, the power delivery controller 200 can also be applied to another bus cable compatible with a USB specification. Meanwhile, the first connector 102 and the second connector 104 are changed accordingly with the another bus cable compatible with the USB specification. In addition, in another embodiment of the present invention, the first connector 102 and the second connector 104 can be other USB connectors compatible with the USB cable 100. In addition, in another embodiment of the present invention, the first connector 102 and the second connector 104 can be other non-USB connectors compatible with the USB cable 100.

The detection pin 2022 is used for detecting whether a power delivery consumer device 120 is coupled to the first connector 102 of the USB cable 100 (or in another embodiment of the present invention, when the power delivery controller 200 is installed within the power delivery provider 130, the detection pin 2022 can be used for detecting whether the USB cable 100 is coupled to the power delivery provider 130, or whether the power delivery consumer device 120 is coupled to the power delivery provider 130), wherein when the detection pin 2022 fails to detect that the power delivery consumer device 120 is coupled to the first connector 102 of the USB cable 100 (or the USB cable 100 is not coupled to the power delivery provider 130, or the power delivery consumer device 120 is not coupled to the power delivery provider 130), at least one of the regulation unit 204, the control unit 206, and a power source unit 1302 and an interface protocol unit 208 of the power delivery provider 130 is turned off (e.g. meanwhile, only the detection unit 202 is turned on), wherein the power delivery provider 130 has a power delivery function.

In addition, when the detection pin 2022 detects that the power delivery consumer device 120 is coupled to the first connector 102 of the USB cable 100 (or in another embodiment of the present invention, when the power delivery controller 200 is installed within the power delivery provider 130, the detection pin 2022 detects that the USB cable 100 is coupled to the power delivery provider 130, or the power delivery consumer device 120 is coupled to the power delivery provider 130), the detection unit 202 can turn on the regulation unit 204 through an enable pin EP to make the regulation unit 204 generate an internal voltage VD (e.g. 5V DC voltage) to the control unit 206 according to the external power source. After the control unit 206 receives the internal voltage VD, the control unit 206 is turned on, and the control unit 206 can control the power source unit 1302 of the power delivery provider 130 to charge the power delivery consumer device 120 according to a power delivery protocol.

In addition, in another embodiment of the present invention, when the detection pin 2022 detects that the power delivery consumer device 120 is coupled to the first connector 102 of the USB cable 100 and the detection unit 202 detects that the power delivery consumer device 120 fails to meet the power delivery protocol, the power delivery consumer device 120 transmits power delivery specifications (e.g. the power delivery consumer device 120 can be charged by 5V DC voltage and 5A DC current) of the power delivery consumer device 120 to the interface protocol unit 208 of the power delivery provider 130 through a pair of signal lines or a power line of the USB cable 100. When the power delivery consumer device 120 is transmitting the power delivery specifications of the power delivery consumer device 120 to the interface protocol unit 208 of the power delivery provider 130 through the pair of signal lines or the power line of the USB cable 100, at least one of the regulation unit 204, the control unit 206, and the power source unit 1302 of the power delivery provider 130 is turned off until the interface protocol unit 208 of the power delivery provider 130 identifies the power delivery specifications of the power delivery consumer device 120.

After the interface protocol unit 208 of the power delivery provider 130 identifies the power delivery specifications of the power delivery consumer device 120, the control unit 206 of the power delivery controller 200 can make the power delivery consumer device 120 imitate to have the power delivery function to meet the power delivery protocol. Then, the control unit 206 can control the power source unit 1302 of the power delivery provider 130 to provide the power to the power delivery consumer device 120 according to the power delivery specifications of the power delivery consumer device 120. That is to say, after the power delivery provider 130 identifies the power delivery specifications of the power delivery consumer device 120, the detection unit 202 turns on the regulation unit 204 through the enable pin EP. The regulation unit 204 can provide the internal voltage VD to the control unit 206 after the regulation unit 204 is turned on. Then, the control unit 206 can make the power delivery consumer device 120 imitate to have the power delivery function and controlthe power source unit 1302 of the power delivery provider 130 to provide the power to the power delivery consumer device 120 according to the internal voltage VD. For example, the control unit 206 can control the power delivery provider 130 to provide 5V voltage and 5A current to the power delivery consumer device 120 according to the internal voltage VD.

In addition, when the detection pin 2022 detects that the power delivery consumer device 120 is coupled to the first connector 102 of the USB cable 100 and the power delivery consumer device 120 meets the power delivery protocol, the power delivery controller 200 is disabled to save power. In addition, in another embodiment of the present invention, when the power delivery consumer device 120 has the power delivery function, the power delivery controller 200 is not disabled.

In another embodiment of the present invention, when the power delivery controller 200 is installed within the power delivery provider 130 and the power delivery consumer device 120 is coupled to the power delivery provider 130 (please refer to FIG. 10), the power delivery provider 130 can first communicate with the power delivery consumer device 120 through the interface protocol unit 208 to confirm the power delivery specifications of the power delivery consumer device 120, and the power source unit 1302 of the power delivery provider 130 can provide the power to the power delivery consumer device 120 accordingly. Meanwhile, because the power source unit 1302 of the power delivery provider 130 does not yet start to provide the power to the power delivery consumer device 120, the power source unit (e.g. the power source unit 1302) within the control unit 206 of the power delivery controller 200 can be turned off. Further, other circuits of the power delivery controller 200 (e.g. the detection unit 202) which are irrelative to the above mentioned communication duration can also be turned off. And after he interface protocol unit 208 of the power delivery provider 130 confirms the power delivery specifications of the power delivery consumer device 120, the policy engine 210 of the control unit 206 just stats to control the power source unit 1302 to provide the power to the power delivery consumer device 120.

Figure 2:
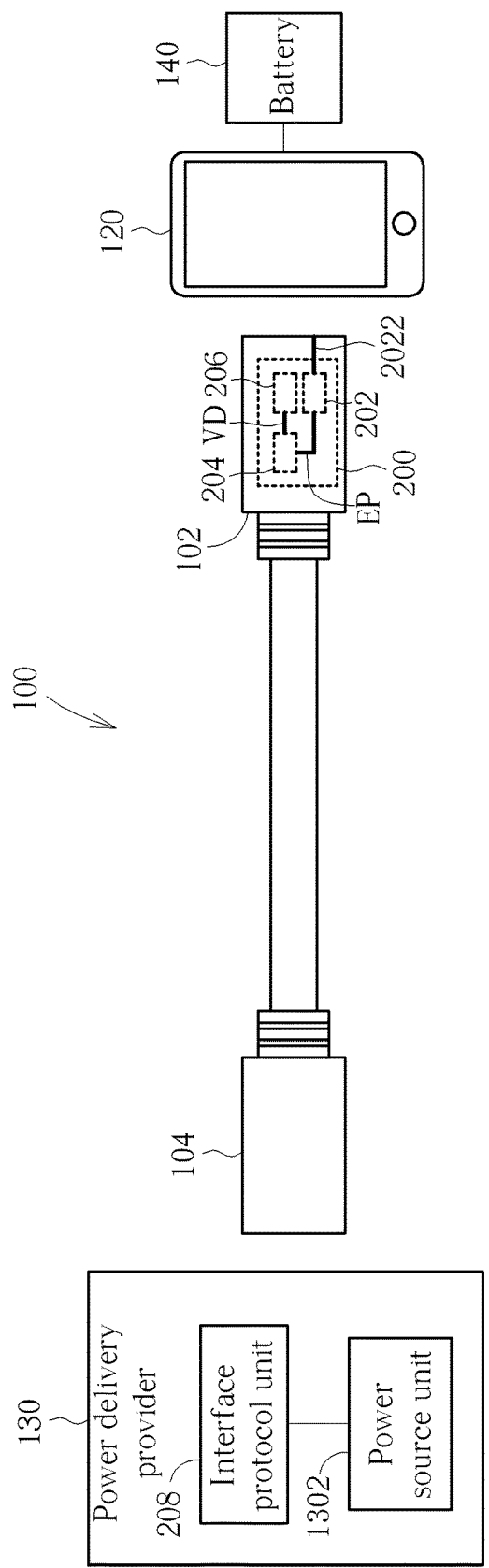
FIG. 2 is a diagram illustrating the power delivery provider charging a battery coupled to the power delivery consumer device through the power delivery consumer device.

Please refer to FIG. 2. FIG. 2 is a diagram illustrating the power delivery provider 130 charging a battery 140 coupled to the power delivery consumer device 120 through the power delivery consumer device 120. As shown in FIG. 2, the power delivery consumer device 120 can transmit a charging state (e.g. a storage power percentage, a charge full state, a stop charge state, and so on) of the battery 140 to the control unit 206, wherein when the control unit 206 receives the charge full state or the stop charge state, the control unit 206 can control the power source unit 1302 of the power delivery provider 130 to stop providing the power to the battery 140 through the power delivery consumer device 120, and when the control unit 206 receives the storage power percentage and the storage power percentage is greater than a predetermined value (e.g. 50%), the control unit 206 can also control the power source unit 1302 of the power delivery provider 130 to stop providing the power to the battery 140 through the power delivery consumer device 120. The power source unit 1302 of the power delivery provider 130 is turned off when the power source unit 1302 stops providing the power to the battery 140 through the power delivery consumer device 120. When the power delivery controller 200 is installed within the power delivery provider 130 (please refer to FIG. 10), the power source unit 1302 can be a part of the control unit 206, and the power source unit 1302 of the control unit 206 can be turned off during the power source unit 1302 stopping providing the power to the battery 140 to save power.

In addition, the power delivery consumer device 120 can periodically transmits the storage power percentage of the battery 140 to the control unit 206. After the power source unit 1302 stops providing the power to the power delivery consumer device 120, the power source unit 1302 can be turned off until the power delivery consumer device 120 transmits the battery charging state to the control unit 206 to ask the power source unit 1302 to provide the power to the battery 140 coupled to the power delivery consumer device 120 again.

Figure 3:
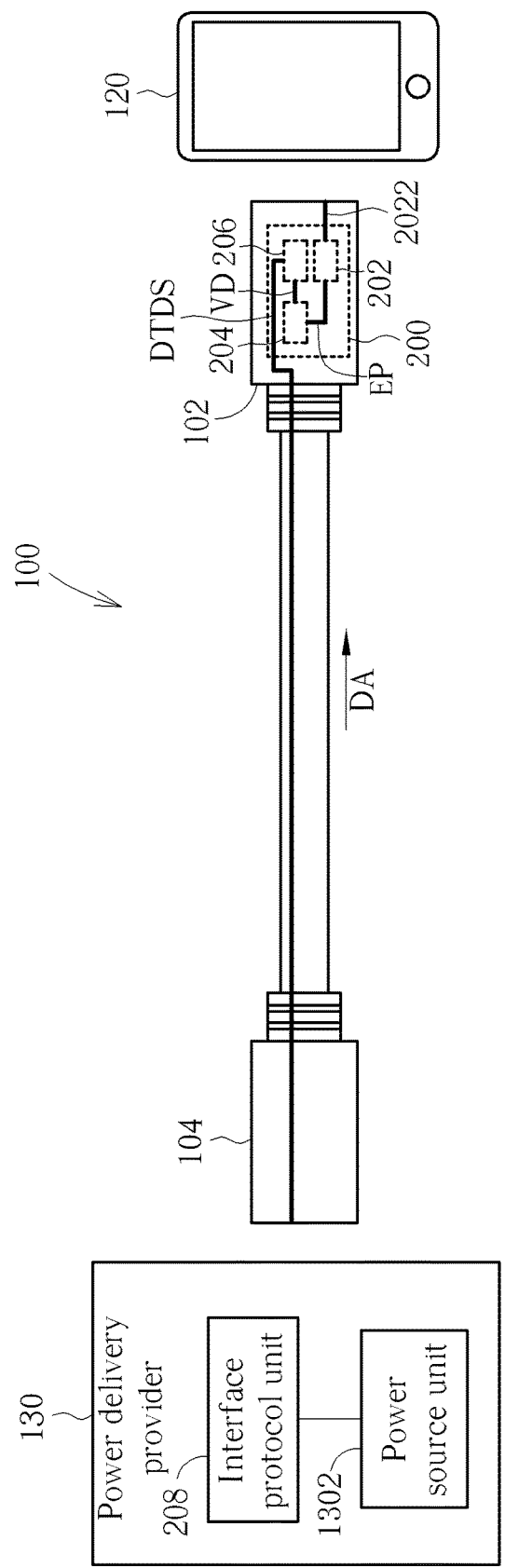
FIG. 3 is a diagram illustrating the control unit being further used for generating a data transmission direction signal to the power delivery provider when the power source unit of the power delivery provider provides the power to the power delivery consumer device.
Figure 4:
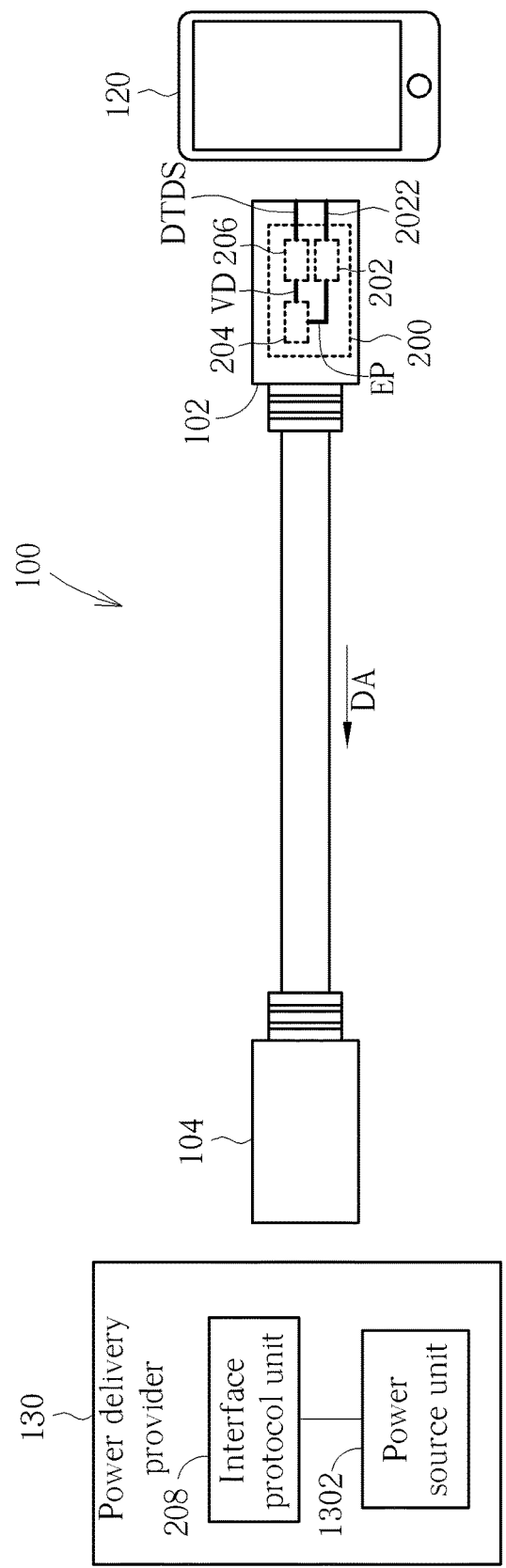
FIG. 4 is a diagram illustrating the control unit being further used for generating the data transmission direction signal to the power delivery consumer device when the power source unit of the power delivery provider provides the power to the power delivery consumer device.

Furthermore, the control unit 206 is capable to generate a data transmission direction signal DTDS to control data to be transmitted from the power delivery provider 130 to the power delivery consumer device 120 or from the power delivery consumer device 120 to the power delivery provider 130, wherein the data are audio data or video data. Please refer to FIG. 3 and FIG. 4. FIG. 3 is a diagram illustrating the control unit 206 being further used for generating the data transmission direction signal DTDS to the power delivery provider 130 when the power source unit 1302 of the power delivery provider 130 provides the power to the power delivery consumer device 120, and FIG. 4 is a diagram illustrating the control unit 206 being further used for generating the data transmission direction signal DTDS to the power delivery consumer device 120 when the power source unit 1302 of the power delivery provider 130 provides the power to the power delivery consumer device 120. As shown in FIG. 3, when the control unit 206 generates the data transmission direction signal DTDS to the power delivery provider 130, the power delivery provider 130 can transmit data DA to the power delivery consumer device 120 according to the data transmission direction signal DTDS, wherein the data DA are audio data or video data. As shown in FIG. 4, when the control unit 206 generates the data transmission direction signal DTDS to the power delivery consumer device 120, the power delivery consumer device 120 can transmit the data DA to the power delivery consumer device 120 according to the data transmission direction signal DTDS, wherein the data DA are audio data or video data.

Figure 5:
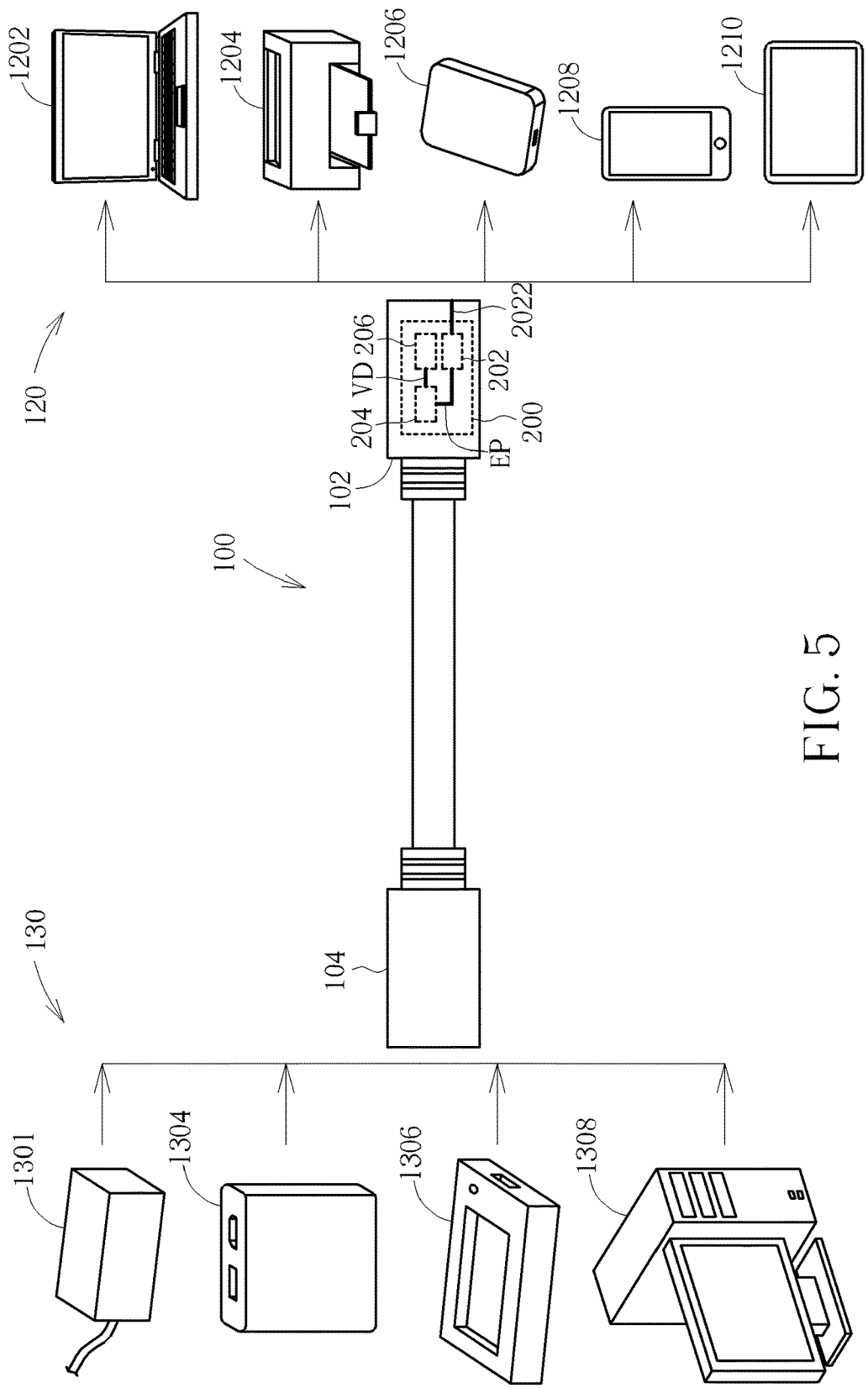
FIG. 5 is a diagram illustrating the power delivery provider, the USB cable, the power delivery controller, and the power delivery consumer device.

Please refer to FIG. 5. FIG. 5 is a diagram illustrating the power delivery provider 130, the USB cable 100, the power delivery controller 200, and the power delivery consumer device 120. As shown in FIG. 5, the power delivery provider 130 can be a charger 1301, a power bank 1304, a charging base 1306, or a desktop computer 1308, and the power delivery consumer device 120 can be a notebook computer 1202, a printer 1204, an external hard drive 1206, a smart phone 1208, or a tablet personal computer 1210.

Figure 6:
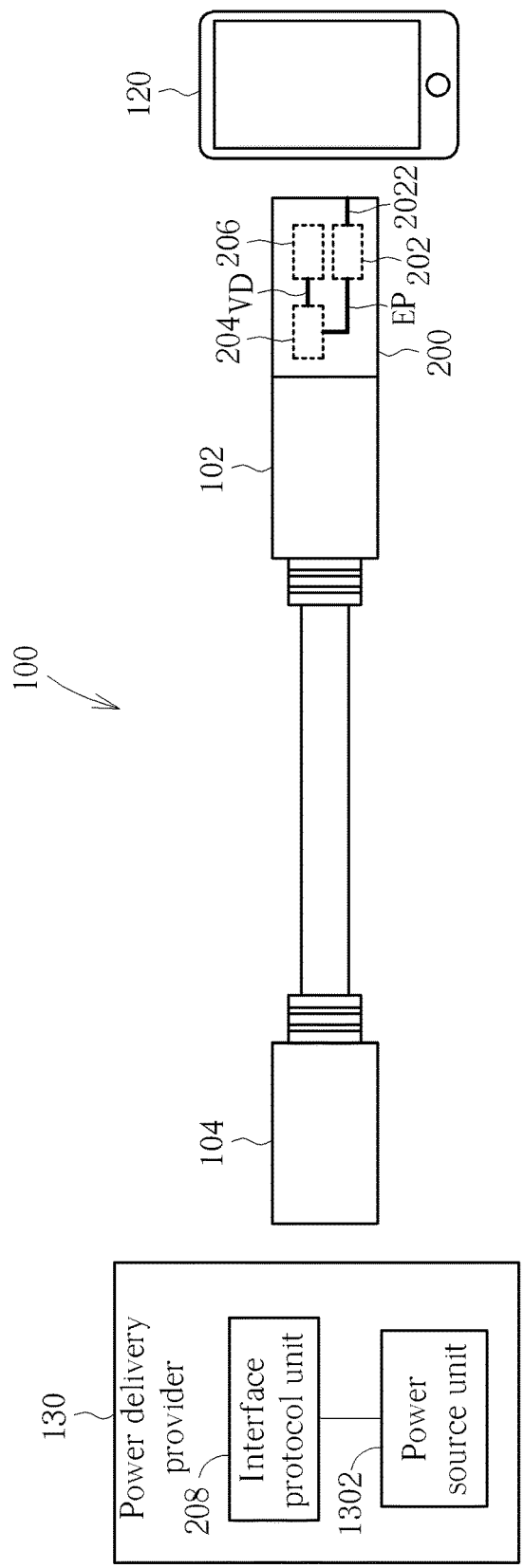
FIG. 6 and FIG. 7 are diagrams illustrating the power delivery controller being coupled to the first connector of the USB cable.
Figure 7:
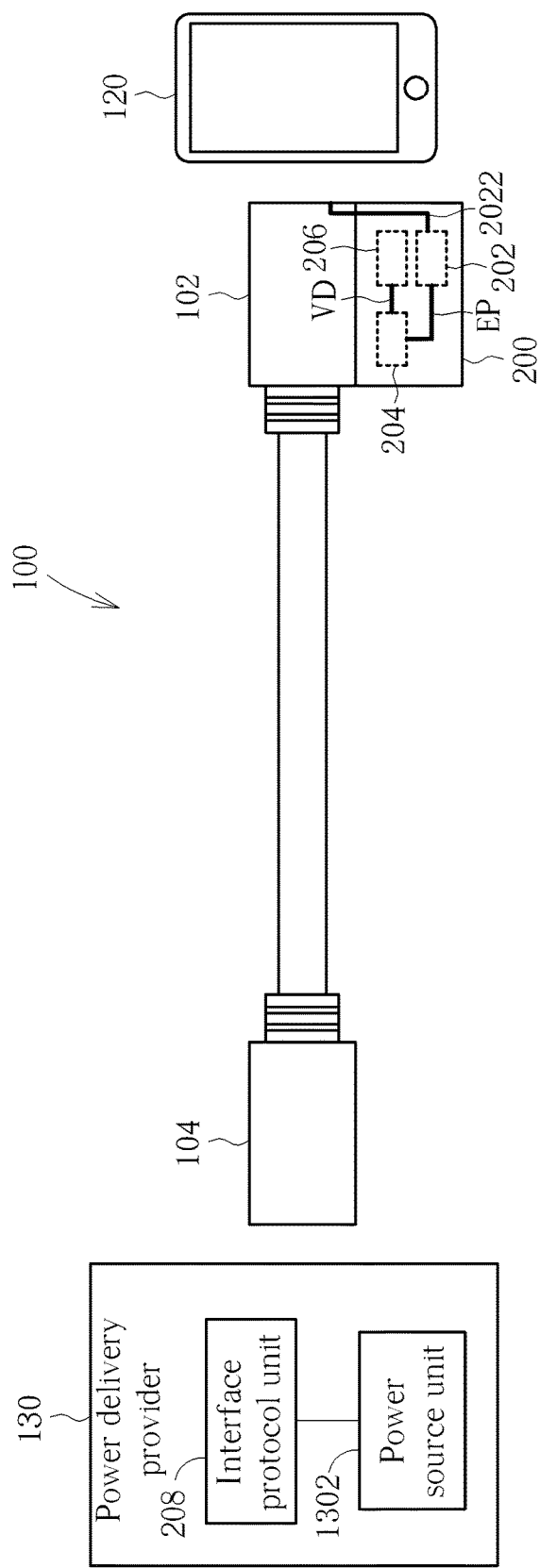
Figure 8:
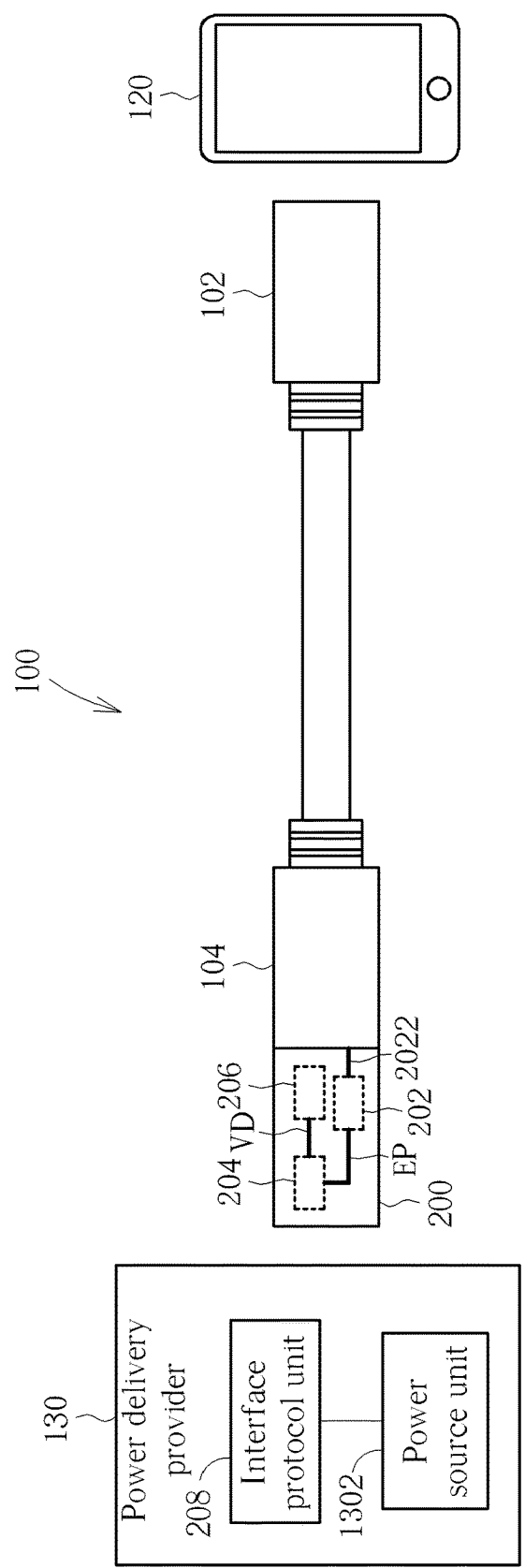
FIG. 8 and FIG. 9 are diagrams illustrating the power delivery controller being coupled to the second connector of the USB cable.
Figure 9:
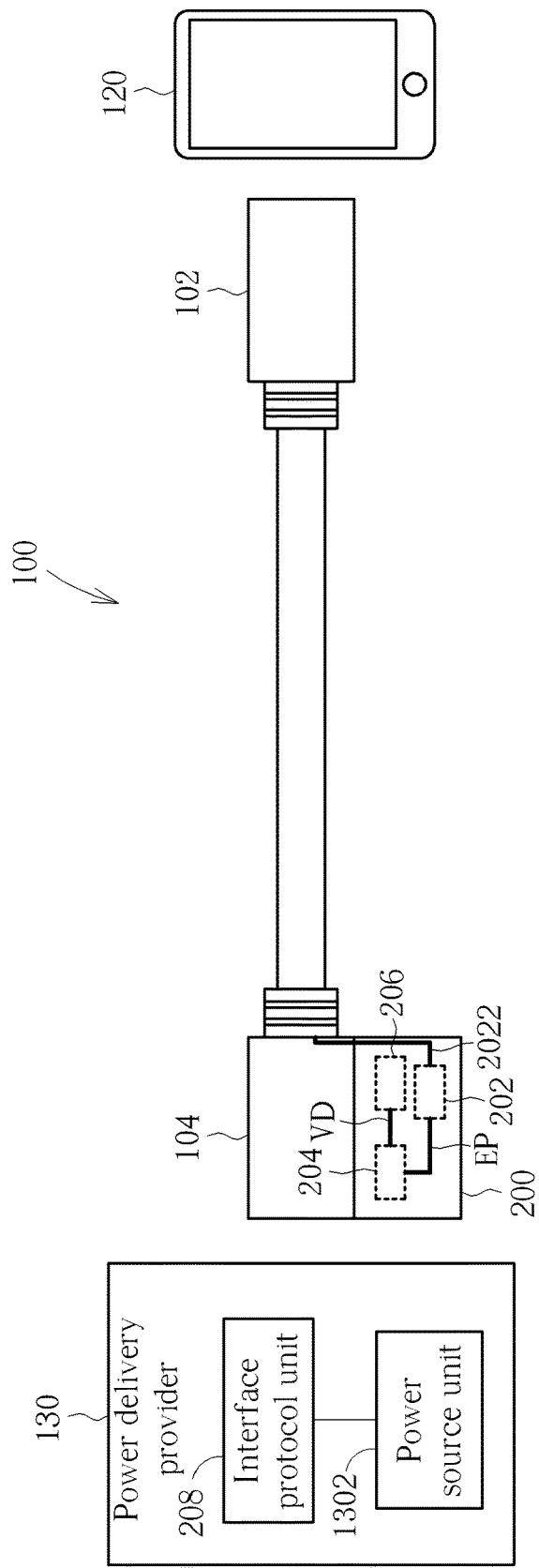

In addition, please refer to FIG. 6 to FIG. 9. FIG. 6 and FIG. 7 are diagrams illustrating the power delivery controller 200 being coupled to the first connector 102 of the USB cable 100, and FIG. 8 and FIG. 9 are diagrams illustrating the power delivery controller 200 being coupled to the second connector 104 of the USB cable 100. As shown in FIG. 6, because the power delivery controller 200 is coupled to the first connector 102 of the USB cable 100, if the USB cable 100 needs to be coupled to the power delivery consumer device 120, the first connector 102 of the USB cable 100 needs to be coupled to the power delivery consumer device 120 through the power delivery controller 200. In addition, as shown in FIG. 7, because the power delivery controller 200 is coupled to the first connector 102 of the USB cable 100, if the USB cable 100 is coupled to the power delivery consumer device 120, the first connector 102 of the USB cable 100 can be directly coupled to the power delivery consumer device 120. In addition, as shown in FIG. 8, because the power delivery controller 200 is coupled to the second connector 104 of the USB cable 100, if the USB cable 100 is coupled to the power delivery provider 130, the second connector 104 of the USB cable 100 needs to be coupled to the power delivery provider 130 through the power delivery controller 200. In addition, as shown in FIG. 9, because the power delivery controller 200 is coupled to the second connector 104 of the USB cable 100, if the USB cable 100 is coupled to the power delivery provider 130, the second connector 104 of the USB cable 100 can be directly coupled to the power delivery provider 130.

Figure 10:
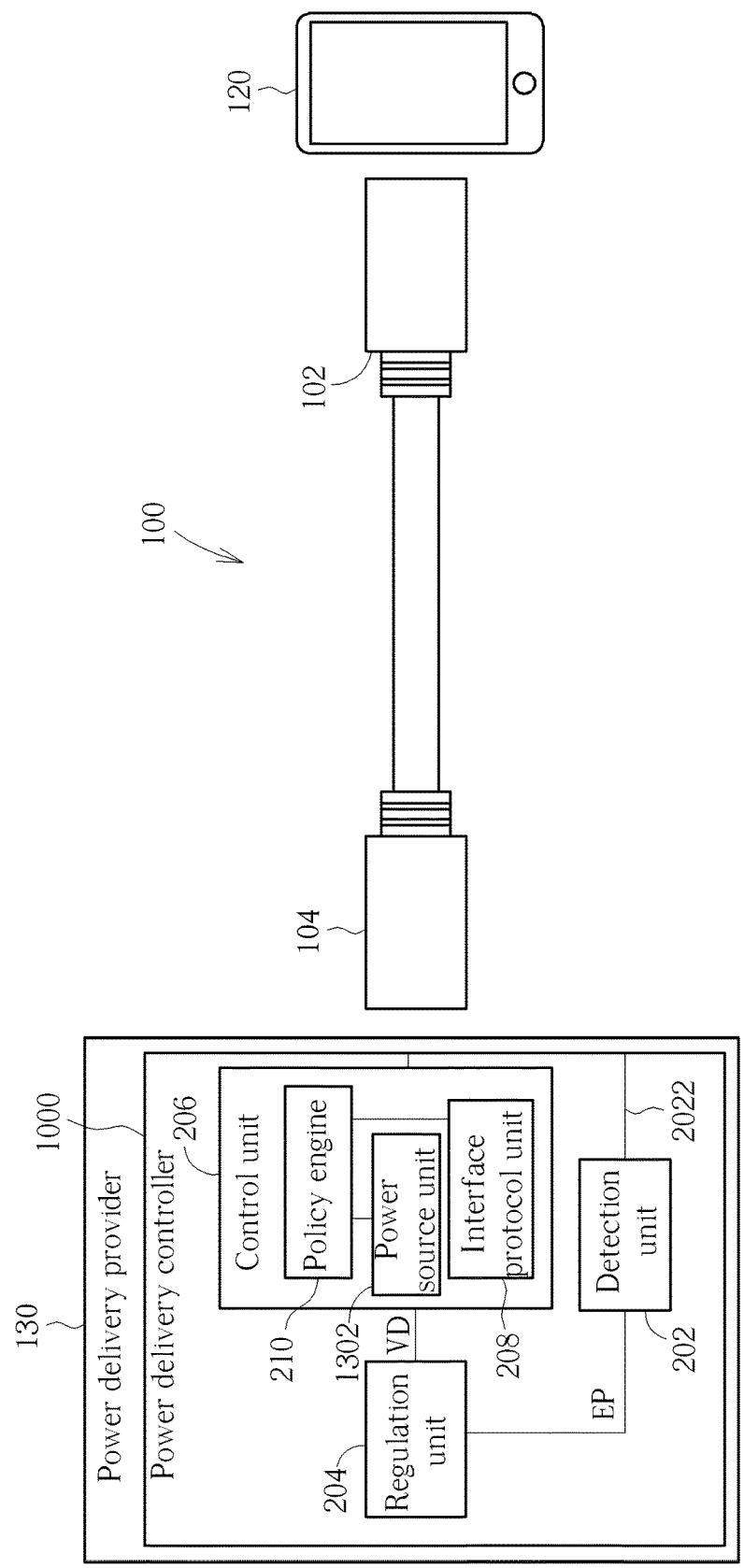
FIG. 10 is a diagram illustrating a power delivery controller applied to the power delivery provider according to a second embodiment of the present invention.

Please refer to FIG. 10. FIG. 10 is a diagram illustrating a power delivery controller 1000 applied to the power delivery provider 130 according to a second embodiment of the present invention, wherein the power delivery provider 130 has the power delivery function. As shown in FIG. 10, the power delivery controller 1000 includes a detection unit 202, a regulation unit 204, and a control unit 206, wherein the regulation unit 204 is coupled to the detection unit 202 and an external power (not shown), the control unit 206 is coupled to the regulation unit 204, the detection unit 202 has a detection pin 2022 and an enable pin EP, and the control unit 206 includes an interface protocol unit 208, a power source unit 1302, and a policy engine 210. But, the present invention is not limited to the control unit 206 only including the interface protocol unit 208, the power source unit 1302, and the policy engine 210.

When the detection pin 2022 fails to detect the power delivery consumer device 120, the regulation unit 204 (or the regulation unit 204 and the control unit 206) is (or are) turned off to save power consumed by the power delivery controller 1000. In addition, if the detection pin 2022 detects the power delivery consumer device 120, the detection unit 202 can turn on the regulation unit 204 through the enable pin EP. The regulation unit 204 can, based on the external power, provide an internal voltage VD (e.g. 5V DC voltage) to the control unit 206 after the regulation unit 204 is turned on. Then, the policy engine 210 of the control unit 206 can control the power source unit 1302 to provide power to the power delivery consumer device 120.

In another embodiment of the present invention, when the detection pin 2022 detects that the power delivery consumer device 120 is coupled to the power delivery provider 130, the power delivery provider 130 can first communicate with the power delivery consumer device 120 through the interface protocol unit 208 to confirm the power delivery specifications of the power delivery consumer device 120, and the power delivery provider 130 can provide the power to the power delivery consumer device 120 accordingly. Meanwhile, the power delivery consumer device 120 can transmit the power delivery specifications of the power delivery consumer device 120 (e.g. the power delivery consumer device 120 can be charged by 5V DC voltage and 5A DC current) to the interface protocol unit 208 of the power delivery provider 130 through the pair of signal lines or the power line of the USB cable 100. When the power delivery consumer device 120 is transmitting the power delivery specifications of the power delivery consumer device 120 to the interface protocol unit 208 of the power delivery provider 130 through the pair of signal lines or the power line of the USB cable 100, at least one of the regulation unit 204 of the power delivery controller 1000 and the power source unit 1302 and the policy engine 210 of the control unit 206 is turned off until the interface protocol unit 208 of the control unit 206 identifies the power delivery specifications of the power delivery consumer device 120.

After the interface protocol unit 208 of the control unit 206 identifies the power delivery specifications of the power delivery consumer device 120, the power source unit 1302 of the control unit 206 can be turned on by the policy engine 210 of the control unit 206, and provide the power to the power delivery consumer device 120 according to the power delivery specifications of the power delivery consumer device 120. In addition, subsequent operational principles of the power delivery controller 1000 are the same as those of the power delivery controller 200, so further description thereof is omitted for simplicity.

To sum up, the regulation unit (or the regulation unit and the control unit) of the power delivery controller is (or are) turned on or off according to whether the power delivery consumer device is coupled to the power delivery controller. In addition, the regulation unit (or the regulation unit and the control unit) of the power delivery controller is (or are) also turned on or off according to a battery charging state of an external battery coupled to the power delivery consumer device. Therefore, the present invention can save more power than the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power delivery controller, comprising:
   a detection unit having a detection pin and an enable pin, wherein the detection pin is used for detecting a power delivery consumer device;
   a regulation unit coupled to the detection unit and an external power, wherein when the detection pin detects the power delivery consumer device, the detection unit is used for turning on the regulation unit through the enable pin, and after the regulation unit is turned on, the regulation unit generates a direction current (DC) internal voltage based on the external power; and
   a control unit coupled to the regulation unit for providing power to the power delivery consumer device according to the DC internal voltage, wherein the control unit does not provide operation power to the detection unit;
   wherein when the detection pin fails to detect the power delivery consumer device, the regulation unit is turned off, or the regulation unit and the control unit are turned off, and the detection unit is still turned on.

2. The power delivery controller of claim 1, wherein the control unit comprises:
   a power source unit;
   an interface protocol unit for communicating power delivery specifications of the power delivery consumer device with the power delivery consumer device; and
   a policy engine for controlling the power source unit to provide the power to the power delivery consumer device according to the power delivery specifications of the power delivery consumer device.

3. The power delivery controller of claim 2, wherein when the detection pin detects the power delivery consumer device, the power source unit is turned off until the interface protocol unit identifies the power delivery specifications of the power delivery consumer device.

4. The power delivery controller of claim 3, wherein when the power source unit charges a battery coupled to the power delivery consumer device through the power delivery consumer device, the power delivery consumer device transmits a storage power percentage, a charge full state, or a stop charge state of the battery to the control unit, wherein when the control unit receives the charge full state or the stop charge state, the power source unit stops providing the power to the battery and the power source unit is turned off, or when the control unit receives the storage power percentage and the storage power percentage is greater than a predetermined value, the power source unit stops providing the power to the battery and the power source unit is turned off.

5. The power delivery controller of claim 1, wherein the control unit is further used for generating a data transmission direction signal, wherein the data transmission direction signal controls data to be transmitted from a power delivery provider to the power delivery consumer device or from the power delivery consumer device to the power delivery provider, and the data are audio data or video data.

6. A power delivery controller, comprising:
a control unit providing power to a power delivery consumer device, wherein the control unit comprises:
a power source unit;
an interface protocol unit for communicating power delivery specifications of the power delivery consumer device with the power delivery consumer device; and
a policy engine for controlling the power source unit to provide the power to the power delivery consumer device according to the power delivery specifications of the power delivery consumer device;
wherein when the interface protocol unit communicates the power delivery specifications of the power delivery consumer device with the power delivery consumer device, the policy engine is turned off or the policy engine and the power source unit are turned off; and after the interface protocol unit identifies the power delivery specifications of the power delivery consumer device, the policy engine turns on the power source unit, and controls the power source unit to provide the power to the power delivery consumer device according to the power delivery specifications of the power delivery consumer device.

7. The power delivery controller of claim 6, wherein when the power source unit charges a battery coupled to the power delivery consumer device through the power delivery consumer device, the power delivery consumer device transmits a storage power percentage, a charge full state, or a stop charge state of the battery to the control unit, wherein when the control unit receives the charge full state or the stop charge state, the power source unit stops providing the power to the battery, and the power source unit is turned off, or when the control unit receives the storage power percentage and the storage power percentage is greater than a predetermined value, the power source unit stops providing the power to the battery, and the power source unit is turned off.

8. A power delivery controller, comprising:
a control unit providing power to a power delivery consumer device, wherein the control unit comprises:
a power source unit;
an interface protocol unit for communicating power delivery specifications of the power delivery consumer device with the power delivery consumer device; and
a policy engine for controlling the power source unit to provide the power to the power delivery consumer device according to the power delivery specifications of the power delivery consumer device, wherein the policy engine is turned off or the policy engine and the power source unit are turned off until the interface protocol unit identifies the power delivery specifications of the power delivery consumer device;
wherein when the power source unit charges a battery coupled to the power delivery consumer device through the power delivery consumer device, the power delivery consumer device transmits a storage power percentage, a charge full state, or a stop charge state of the battery to the control unit, wherein when the control unit receives the charge full state or the stop charge state, the power source unit stops providing the power to the battery, and the power source unit is turned off, or when the control unit receives the storage power percentage and the storage power percentage is greater than a predetermined value, the power source unit stops providing the power to the battery, and the power source unit is turned off.

9. The power delivery controller of claim 8, further comprising:
a detection unit having a detection pin and an enable pin, wherein the detection pin is used for detecting the power delivery consumer device; and
a regulation unit coupled to the detection unit and an external power, wherein when the detection pin detects the power delivery consumer device, the detection unit is used for turning on the regulation unit through the enable pin, and after the regulation unit is turned on, the regulation unit generates a DC internal voltage based on the external power;
wherein the control unit is used for providing the power to the power delivery consumer device according to the DC internal voltage;
wherein when the detection pin fails to detect the power delivery consumer device, the regulation unit is turned off.

10. The power delivery controller of claim 9, wherein when the detection pin fails to detect the power delivery consumer device, the control unit is turned off.

* * * * *